Figure 10:
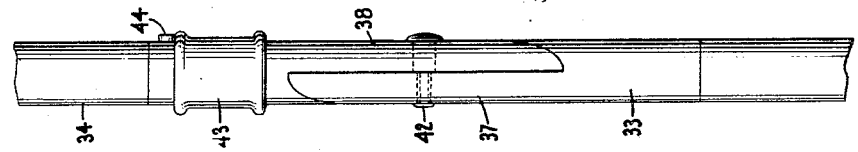

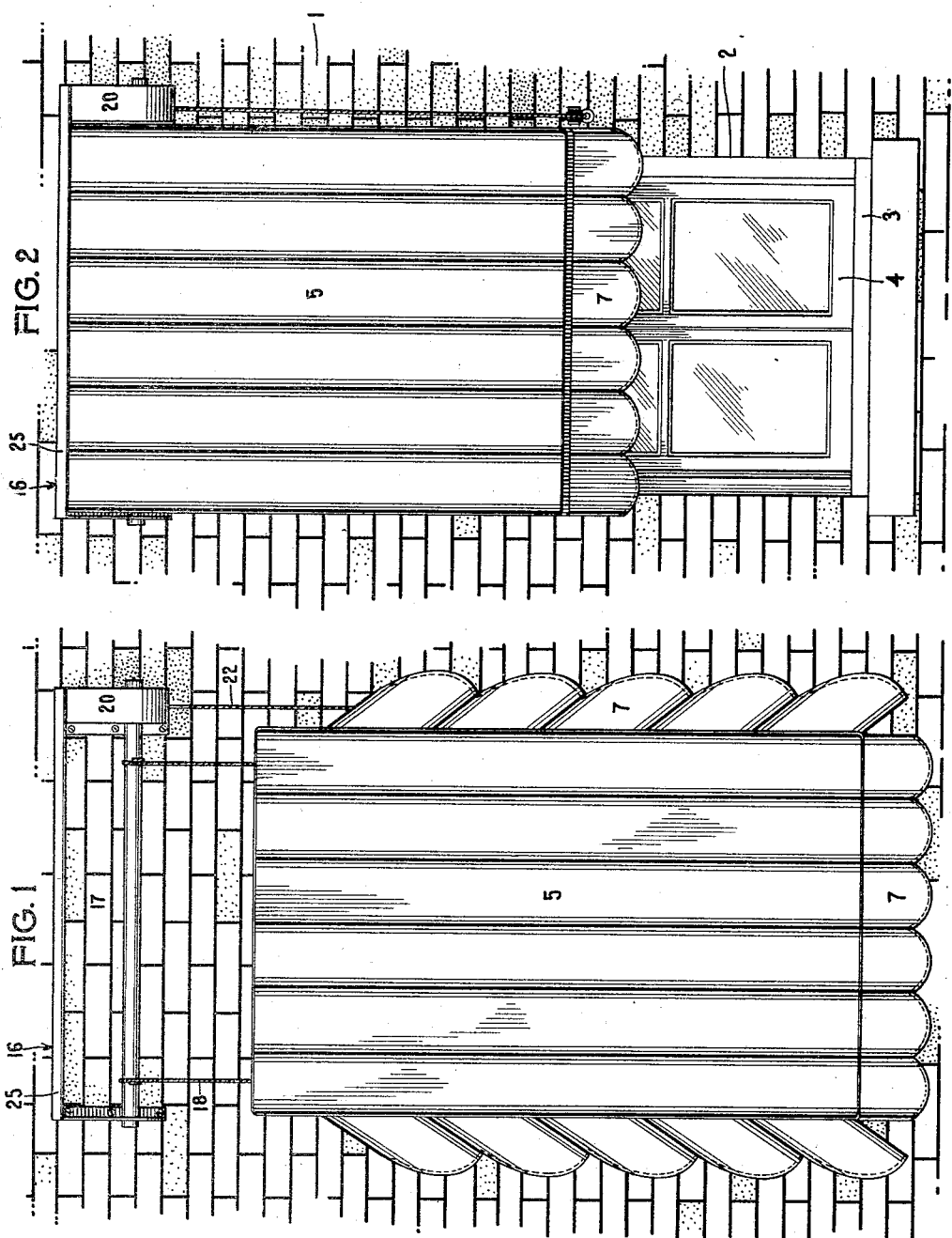

March 8, 1932.  C. F. MILLER ET AL  1,848,263
COMBINED AWNING AND SHUTTER
Filed Dec. 11, 1928   3 Sheets-Sheet 2
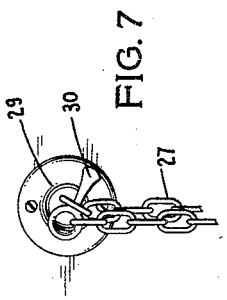
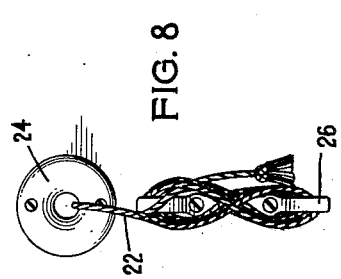
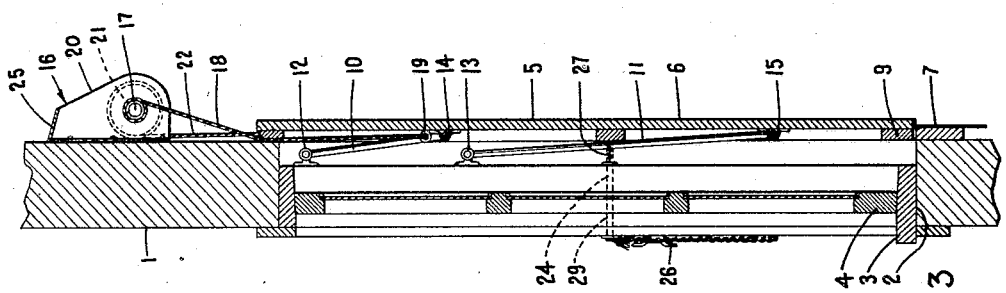
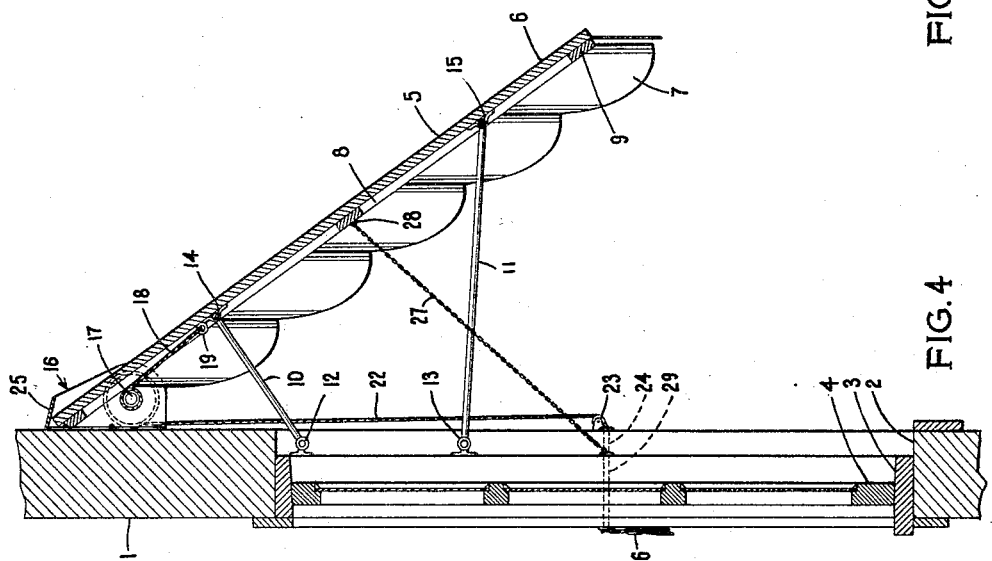
Inventors
Chas. F. Miller &
S. W. Brundage
By
Their Attorney March 8, 1932.  C. F. MILLER ET AL  1,848,263

COMBINED AWNING AND SHUTTER

Filed Dec. 11, 1928  3 Sheets-Sheet 3

Inventors
Chas. F. Miller &
S. W. Brundage
By
Their Attorney

Patented Mar. 8, 1932

1,848,263

UNITED STATES PATENT OFFICE

CHARLES F. MILLER AND SETH W. BRUNDAGE, OF MIAMI, FLORIDA

COMBINED AWNING AND SHUTTER

Application filed December 11, 1928. Serial No. 325,223.

The invention relates to protective means for the windows of dwelling houses and other buildings and has special reference to a combined or convertible awning and shutter.

The principal object of the invention, generally stated, is to provide a relatively rigid structure which when in one position serves simply as an awning for a window and which when in its shifted position extends over and entirely closes the window opening for protection against hurricanes or other violent storms or for general protection when the building is closed and unoccupied for any length of time.

An important object of the invention is to provide a structure of this character having a novel mounting permitting the shifting from one selected position to another without necessitating the employment of hinges as are customarily used in devices of this general class, the awning or shutter member being bodily shiftable and the side of the building itself serving as the abutment for the upper end of the member when it is in awning forming position.

Another object of the invention is to provide a convertible structure of this type equipped with very simply operated means for raising and lowering, this means being capable of actuation from the interior of the building so that it will be unnecessary to open the window.

Another object is to provide a structure of this type equipped with novel means for shedding water and preventing it from ever working down beneath the awning.

Another feature is to provide a shutter structure which may fit within the window opening or which may overlap the sides thereof, depending upon the preference of the manufacturer and user.

Still another object is to provide a device of this character having flexible members operable to swing the shutter into closed relation to the window, these flexible members also serving as locking or securing means to prevent opening of the shutter from the outside.

A more detailed object is the provision in an awning and shutter structure of a peculiar arrangement of brace links which operate to give the desired movement and direction when the device is being shifted from one position to the other, certain of the links acting as braces to hold the movable member rigidly in its awning position with sufficient tension to prevent any looseness and consequent rattling.

A further object is to provide a combined awning and shutter of rigid material and which is preferably covered on its outer side with ornamental fabric which will operate to reduce a likelihood of the rigid material becoming water soaked, greater durability being consequently obtained.

An additional object is to provide a structure of this character which will be comparatively simple and inexpensive to manufacture and install, positive in action, efficient and durable in service, and a general improvement in the art.

Figure 9:
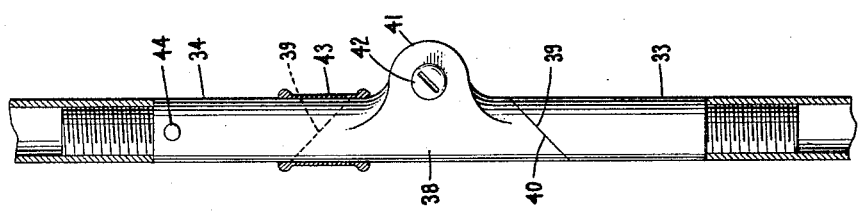
Figure 5:
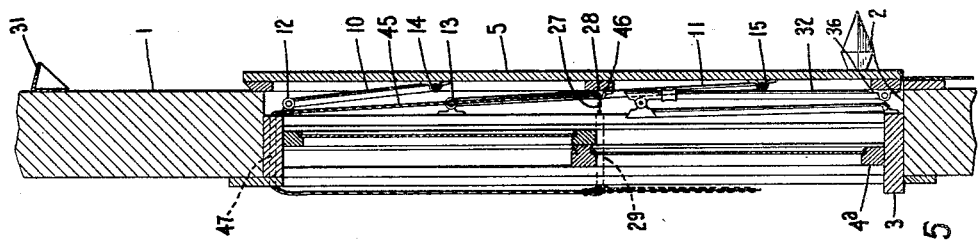
Figure 6:
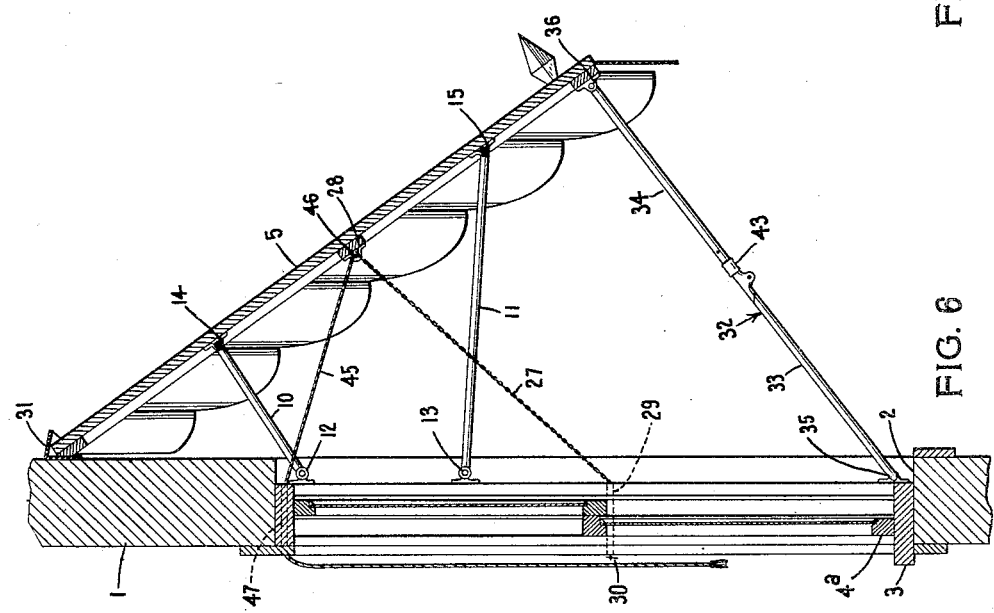

To the attainment of the foregoing and other objects and advantages, the invention preferably consists in the details of construction and the arrangement and combination of parts to be hereinafter more fully described and claimed, and illustrated in the accompanying drawings in which:

Figure 1 is a front elevation of one form of the device showing it in shutter position, Figure 2 is a similar view showing it in awning position, Figure 3 is a vertical sectional view through the side of a building and showing the device in window closing position, Figure 4 is a similar view with the parts arranged to form an awning, Figure 5 is a view similar to Figure 3 showing a modified structure, Figure 6 is a sectional view similar to Figure 4 illustrating this modification, Figure 7 is a detail view showing the lowering chain and the manner of use as securing means, Figure 8 is a detail view showing the raising cord or flexible member together with the means for holding it, and Figures 9 and 10 are detail views of the brace structure.

Referring more particularly to the drawings, and especially Figures 1 to 4, the numeral 1 designates the wall of a building having a window opening 2 within which is a window frame 3 carrying sashes 4. In carrying out the invention we provide a combined awning and shutter structure including, primarily, a rigid rectangular member 5 which may be formed of wood or metal and of one or more pieces as preferred and made as ornamental as may be desired. A very satisfactory construction is to provide a fabric covering 6 which may depend at the sides and lower end to define a valance 7. Of course we are not contemplating being limited in this manner but these details are mentioned as the provision of a fabric cover on the rigid member will act as a protector therefor and shed water instead of allowing the rigid member to become saturated. It is thought that in this way very fanciful and ornamental effects may be obtained while increasing the durability. The member 5 may be and preferably is reinforced by longitudinal and transverse strips, cleats or battens 8 and 9 so as to provide the proper rigidity. Of course some equivalent may also be used.

For mounting the member 5 so that it may serve either as an awning or as a shutter, depending upon weather conditions, etc., we provide pairs of links or arms 10 and 11 which are preferably the ends of U shaped members pivoted respectively in suitable brackets 12 and 13 on the window frame and pivotally connected with other brackets 14 and 15 on the underside of the member 5. The arms or links 10 are arranged in outwardly diverging relation to the arms 11, this relation being provided so that the member 5 will have the proper travel between its elevated position shown in Figures 2 and 4 and its lowered or shutter forming position shown in Figures 1 and 3, it being rather important that these arms or links have the proper throw to insure flat engagement of the member 5 against the wall of the building or against the outside of the window frame, as might be preferred. The structure would undoubtedly be more weatherproof by having the member 5 abut against the outside surface of the wall of the building so as to overlap the window opening therein and this arrangement is disclosed in Figure 3.

In addition to the foregoing, we provide some suitable sort of frame 16 on the outside of the building and considerably above the window opening. Journaled in this frame is a winding rod 17 which may conveniently be a length of pipe of reasonable diameter, and secured to and wrapped about this rod or roller are flexible members 18 which are secured to the underside of the member 5 at points spaced downwardly from the upper end or edge as clearly indicated in Figure 4, the point of connection being designated at 19. At one end of the frame 16 we provide a housing or casing 20 within which is located a reel 21 secured upon the roller or rod 17 and having secured to and wrapped thereabout a flexible member 22 which extends downwardly along the building wall, over a guide pulley 23, and through a suitable bushing or tube 24 which extends through the wall or window frame. The above described parts constitute the means for raising the member 5 from its shutter forming position shown in Figures 1 and 3 into its awning forming position shown in Figures 2 and 4 and it will be noted that when the member 5 is in its uppermost position its upper end is received beneath an overhanging flange 25 forming part of the frame 16 and acting as a water shed so that rain cannot beat in between the member 5 and the wall.

When the member 5 is thus raised it is of course apparent that tension must be maintained on the member 22 so as to hold the parts rigid and this can be very simply accomplished by wrapping the member 22 back and forth over a double ended awning hook or cleat 26 shown in Figure 8.

The lowering means may very simply comprise a chain or other flexible member 27 secured at one end to the underside of the member 5 as shown at 28 and having its other end extending through a bushing or tube 29 extending through the wall or window frame. It is a feature that the end of this chain carries a locking bar 30 which may be inserted through a selected link when the chain is pulled taut for the purpose of maintaining the member 5 under a certain degree of tension when in awning forming position, or for holding the member 5 against opening movement when it is in shutter forming position.

In the operation of this form, assuming that the member 5 is in its lowered or shutter forming position shown in Figures 1 and 3, and with the flexible member 22 wound upon the reel 21, and with the chain 27 held taut by the lock bar 30, in order to raise the device into awning forming position, it is necessary to remove the lock bar 30 from engagement through the chain link receiving it, and then pull upon the flexible member 22. When this is done, it is quite apparent that the reel 21 and pipe or rod 17 will be rotated whereupon the flexible members 18 will be wound onto the pipe or drum 17, resulting first in outward movement of the upper end of the member 5 and then in an upward movement thereof combined with an angular movement owing to the provision of the pairs of links or arms 10 and 11 so that the member 5 will be raised into the position shown in Figures 2 and 4, the upper end entering beneath the water-shed 25. When this proper position has been reached, the loose end of the flexible member 22 is wrapped back and forth about the cleat 26. To effect lowering of the device into shutter forming position the first operation is followed in an obvious manner.

It is of course to be understood that it is not necessary in all cases to provide a winding mechanism for effecting raising of the combined shutter and awning member and in Figures 5 and 6 we have illustrated a modification in which different means is provided. Referring to these figures in detail the wall 1 has a window opening 2 therein within which is mounted the window frame 3 carrying sashes which may be of the casement type shown in Figures 1 to 4 or which may be of the sliding type as indicated at 4ª. The member 5 may be of identically the same construction as above described and mounted by means of pairs of arms or links 10 and 11 in the same manner, the respective pivots being indicated at 12, 13, 14 and 15. However, in lieu of the above described frame 16 and windlass mechanism therein, we provide a simple water-shed 31 which in ordinary practice may be merely an angular metal plate anchored to the building wall in any desired manner and so positioned as to extend over the upper end of the member 5 when the latter is in raised or awning forming position. The lowering means may comprise a chain 27 secured to the member 5 at 28 and passing through a tube or bushing 29 in the window frame or building wall and carrying a lock bar 30 just as above described, though an equivalent structure might be provided if found advisable.

In addition to the arms 10 and 11 we may provide brace means such as the rule joint braces 32 each of which includes sections 33 and 34 pivoted respectively at 35 and 36 to the window frame and member 5. Instead of providing a conventional rule joint between the sections 33 and 34 we prefer to incorporate the structure illustrated in detail in Figures 9 and 10 from which it will be seen that the adjacent ends of the sections 33 and 34 are cut partly away to define overlapping extensions 37 and 38, the partial cutting away defining inclined cooperating shoulders 39 and 40. The extensions have lateral projections 41 connected by a pivot bolt 42 or the like and it will be readily apparent that the shoulders 39 will operate to prevent relative pivotal movement of the sections in one direction while permitting it in the other. It is highly desirable to prevent accidental breaking of the joint and we may accomplish this by providing a sleeve 43 slidable upon the section 34 and overlapping the extension 37 when the sections 33 and 34 are in alinement. The sleeve is prevented from sliding down along the section 34, when the sections 33 and 34 are swung into substantially parallel relation when the device is in shutter forming position as shown in Figure 5, by means of a pin or other stop 44 on the section 34.

The hoisting means in this instance may comprise simply a suitable flexible member 45 connected with the member 5 at 46 and extending through a hole, tube or bushing 47 in the window frame, or building wall as preferred, at the top of the window opening, the loose end hanging down inside the building in convenient position to be grasped and pulled when it is desired to raise the member 5 from its shutter forming position into position as an awning.

In the operation of this form of the device it is apparent that if the device is in awning position as shown in Figure 6 and it is desired to lower it into shutter forming position, the lower sash must be raised so that the operator may reach out and slide the sleeve 43 upwardly along the section 34 so that it will be disengaged from the extension 37 on each brace section 33. The braces 32 are then "broken" by pulling upwardly on the sections 33 whereupon the member 5 may descend by gravity. If it does not, it is merely necessary to exert a pull upon the chains 27 so as to swing the member 5 down. Owing to the provision of the pairs of arms 10 and 11 the member 5 will travel bodily downwardly away from the water-shed 31 and will come into contact flat against the building wall and close the window opening. When the chains 27 are pulled taut the locking bars 30 are inserted through the links at the entrances to the bushings or tubes 29 and the device will be positively secured against opening movement from the outside. When it is desired to raise the member 5 into awning forming position, the locking bars 30 must be first disengaged from the chains 27, whereupon the pull upon the flexible members 45 will raise the member 5 and cause it to swing upon and with the arms 10 and 11 into elevated position, the upper end being received beneath the water-shed 31. The braces 32 will straighten during this action and the sleeves 43 will probably slide gravitationally downwardly over the extensions 37. If the braces do not straighten automatically, it is a simple matter to raise the lower sash, reach out and press the braces 32 downwardly. It is probably preferable that the construction be such as to require manual depression of the braces inasmuch as by this means a positive tension may be be placed upon the member 5 which will hold it firmly in position so that there can be no shaking and rattling in case of wind. By constructing each of the sections 33 and 34 of solid end sections screwed into pipe sections as shown in Figure 9, it is possible to vary the length of the sections in exactly the same manner as if turnbuckles were provided, this adjustment being of advantage to insure the placing of tension against the lower end of the member 5 when the braces 32 are straightened.

From the foregoing description and a study of the drawings it will be apparent that we have thus provided a very simple device capable of acting simply as an awning for the protection of window openings and also as a shutter for protection during hurricanes or other severe atmospheric disturbances. In addition to this the device takes the place of the well known boarding applied to windows of houses or other buildings that are to be left unoccupied for a considerable length of time. It is believed that the construction, operation and advantages should be clear to one skilled in the art without further explanation.

While we have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, we claim:

1. A combined awning and shutter structure for a window opening, comprising a rigid member, arm means pivotally mounted upon a building and pivotally connected with said rigid member whereby the latter may be shifted bodily from an inclined position with its upper end adjacent the building wall and above the window opening into a substantially vertical position covering the window opening, said arm means being so arranged that when the rigid member is in vertical position covering the opening the pivotal axis of the arm means with the building is spaced above the pivotal axis of the arm means with the rigid member and means connected with the rigid member for moving it upwardly from said vertical position into said inclined position.

2. A combined awning and shutter structure for a window opening, comprising a rigid member, arm means pivotally mounted upon a building and pivotally connected with said rigid member whereby the latter may be shifted bodily from an inclined position with its upper end engaging the building wall above the window opening into a substantially vertical position covering the window opening, said arm means extending in a downward direction from the building to the rigid member when the latter is in vertical position covering the opening, flexible means connected with the rigid member for moving it upwardly from said vertical position into said inclined position, and flexible means for securing the rigid member in said vertical position.

3. A combined awning and shutter structure for a window, comprising a rigid member, arm means pivotally mounted upon a building and pivotally connected with said rigid member whereby the latter may be shifted bodily from an inclined position with its upper end engaging the building wall above the window into a position lying flat against the wall and covering the window, means connected with the rigid member for moving it upwardly, other means connected with the rigid member for moving it downwardly, and means for securing the rigid member in the second named position, said last named means forming part of said lowering means.

4. A combined awning and shutter structure for a window opening, comprising a rigid member, pairs of arms pivotally mounted upon a building and pivotally connected with said rigid member, the arms of one pair being of greater length than the arms of the other pair whereby the latter may be shifted bodily from an inclined position with its upper end adjacent the building wall and above the window opening into a substantially vertical position covering the window opening, said pairs of arms extending in a downward direction from the building to the rigid member when the latter is in vertical position covering the opening and the shorter pair of arms being mounted on the building adjacent the top of the opening.

5. A combined awning and shutter structure for the window openings of a building, comprising a rigid member of a size substantially the same as that of the window opening, pairs of arms pivotally mounted with respect to the building wall and pivotally connected with said rigid member, said member being swingable with respect to and with said arms to be disposed selectively in inclined position serving as an awning with its upper end engaging against the building wall above the window opening or into lowered position flat against the building wall to form a shutter closing the window opening, flexible members connected with said rigid member and adapted to be pulled for raising said rigid member into awning forming position, and other flexible members connected with said rigid member and adapted to be pulled for swinging the rigid member into shutter forming position.

6. A combined awning and shutter structure for the window openings of a building, comprising a rigid member of a size substantially the same as that of the window opening, pairs of arms pivotally mounted with respect to the building wall and pivotally connected with said rigid member, said member being swingable with respect to and with said arms to be disposed selectively in inclined position serving as an awning with its upper end engaging against the building wall above the window opening or into lowered position flat against the building wall to form a shutter closing the window opening, flexible members connected with said rigid member and adapted to be pulled for raising said rigid member into awning forming position, and other flexible members connected with said rigid member and adapted to be pulled for swinging the rigid member into shutter forming position, said pairs of arms being arranged in outwardly divergent relation for insuring movement of the rigid member in the proper path when shifted from one position to the other.

7. A combined awning and shutter structure for the window openings of a building, comprising a rigid member of a size substantially the same as that of the window opening, pairs of arms pivotally mounted with respect to the building wall and pivotally connected with said rigid member, said member being swingable with respect to and with said arms to be disposed selectively in inclined position serving as an awning with its upper end engaging against the building wall above the window opening or into lowered position flat against the building wall to form a shutter closing the window opening, flexible members connected with said rigid member and adapted to be pulled for raising said rigid member into awning forming position, other flexible members connected with said rigid member and adapted to be pulled for swinging the rigid member into shutter forming position, and an angular plate member on the building wall receiving beneath it the upper end of the rigid member when the latter is in awning forming position and acting as a water-shed.

8. A combined awning and shutter structure for the window openings of a building, comprising a rigid member of a size substantially the same as that of the window opening, pairs of arms pivotally mounted with respect to the building wall and pivotally connected with said rigid member, said member being swingable with respect to and with said arms to be disposed selectively in inclined position serving as an awning with its upper end engaging against the building wall above the window opening or into lowered position flat against the building wall to form a shutter closing the window opening, flexible members connected with said rigid member and adapted to be pulled for raising said rigid member into awning forming position, other flexible members connected with said rigid member and adapted to be pulled for swinging the rigid member into shutter forming position, and means for maintaining the second named flexible members under tension.

9. A combined awning and shutter for a window opening of a building comprising a rigid member, two pairs of arms respectively pivotally mounted upon the building and pivotally connected to the rigid member, said pairs of arms being spaced a greater distance apart at their points of pivotal connection with the rigid member than at their points of pivotal connection to the building wall whereby said rigid member may be bodily moved from a substantially vertical position covering the window opening to an inclined position with its upper end adjacent the building wall and above the window opening, and means associated with said rigid member for moving it from said vertical position into said inclined position.

10. A combined awning and shutter for a window opening comprising a rigid member adapted to be disposed in a substantially vertical position to serve as a shutter for the opening and in an inclined position with its upper end spaced above the window opening to serve as an awning for the latter, a pair of arms pivotally mounted upon the building and pivotally connected to the rigid member, said pairs of arms being spaced a greater distance apart at their points of pivotal connection to the rigid member than at their points of connection to the building wall and the arms of one pair being of greater length than the arms of the other pair, and means for maintaining the rigid member in said inclined position.

In testimony whereof we affix our signatures.

CHARLES F. MILLER.
SETH W. BRUNDAGE.